United States Patent
Ozeki et al.

(10) Patent No.: US 12,108,014 B2
(45) Date of Patent: Oct. 1, 2024

(54) IMAGE PROCESSING DEVICE AND HEAD-UP DISPLAY

(71) Applicant: Japan Display Inc., Tokyo (JP)

(72) Inventors: Daisuke Ozeki, Tokyo (JP); Takeo Koito, Tokyo (JP); Chikyu Nakaoka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 113 days.

(21) Appl. No.: 17/875,410

(22) Filed: Jul. 28, 2022

(65) Prior Publication Data

US 2022/0377305 A1 Nov. 24, 2022

Related U.S. Application Data

(63) Continuation of application No. PCT/JP2020/045555, filed on Dec. 7, 2020.

(30) Foreign Application Priority Data

Jan. 28, 2020 (JP) .................................. 2020-011746

(51) Int. Cl.
*H04N 13/117* (2018.01)
*G02B 27/01* (2006.01)
*H04N 13/31* (2018.01)

(52) U.S. Cl.
CPC ....... *H04N 13/117* (2018.05); *G02B 27/0101* (2013.01); *H04N 13/31* (2018.05); *G02B 2027/014* (2013.01)

(58) Field of Classification Search
CPC .... H04N 13/117; H04N 13/31; H04N 13/139; G02B 27/0101; G02B 2027/014;
(Continued)

(56) References Cited

U.S. PATENT DOCUMENTS

| 10,186,236 B2 * | 1/2019 | Akenine-Moller ...... G09G 5/39 |
| 2002/0080495 A1 * | 6/2002 | Anderson .......... G02B 27/0101 |
| | | 359/742 |

(Continued)

FOREIGN PATENT DOCUMENTS

| JP | 7-182533 A | 7/1995 |
| JP | 10-271535 A | 10/1998 |

(Continued)

OTHER PUBLICATIONS

International Search Report and Written Opinion mailed on Feb. 22, 2021, received for PCT Application PCT/JP2020/045555, filed on Dec. 7, 2020, 9 pages including English Translation.

(Continued)

*Primary Examiner* — Tung T Vo
(74) *Attorney, Agent, or Firm* — XSENSUS LLP (57) ABSTRACT

According to one embodiment, an image processing device includes an acquisition unit which obtains a target image, a generation unit which generates a three-dimensional image by reordering a plurality of video signals corresponding to the obtained target image such that each of the video signals is written to one of a plurality of pixels arranged in a horizontal direction while skipping a predetermined number of pixels, and an output unit which outputs the generated three-dimensional image to a display device.

7 Claims, 5 Drawing Sheets

(58) Field of Classification Search
CPC ........ G02B 30/30; G02B 27/01; G03B 35/24; G09G 5/00; G09G 5/36
USPC .......................................................... 348/54
See application file for complete search history.

(56) References Cited

U.S. PATENT DOCUMENTS

| | | | |
|---|---|---|---|
| 2007/0146235 A1* | 6/2007 | Nolan | G01C 21/365 345/7 |
| 2008/0246757 A1* | 10/2008 | Ito | G06T 15/10 348/E13.008 |
| 2009/0128622 A1 | 5/2009 | Uchiumi et al. | |
| 2011/0098056 A1* | 4/2011 | Rhoads | G06F 3/023 345/173 |
| 2012/0218258 A1 | 8/2012 | Mashitani | |
| 2014/0375816 A1* | 12/2014 | Maihoefer | H04N 7/183 348/148 |
| 2017/0264860 A1* | 9/2017 | Shiohara | H04N 7/0127 |
| 2019/0385006 A1* | 12/2019 | Kashitani | H04N 25/70 |

FOREIGN PATENT DOCUMENTS

| | | |
|---|---|---|
| JP | 2007-36528 A | 2/2007 |
| JP | 2012-182569 A | 9/2012 |

OTHER PUBLICATIONS

Japanese Office Action issued Oct. 17, 2023 in corresponding Japanese Patent Application No. 2020-011746 (machine-generated English translation only).
Global Dossier translation of Chinese Office Action issued Feb. 18, 2024 in corresponding Chinese Patent Application No. 202080094874. 1, 6pp.

* cited by examiner

IMAGE PROCESSING DEVICE AND HEAD-UP DISPLAY

CROSS-REFERENCE TO RELATED APPLICATIONS

This application is a Continuation Application of PCT Application No. PCT/JP2020/045555, filed Dec. 7, 2020, and based upon aria claiming the benefit of priority from Japanese Patent Application No. 2020-011746, filed Jan. 28, 2020, the entire contents of all of which are incorporated herein by reference.

FIELD

Embodiments described herein relate generally to an image processing device and a head-up display.

BACKGROUND

In recent years, a display device which enables a viewer to view a three-dimensional image with the naked eye has become widespread. The three-dimensional image displayed in this type of display device is generated by, for example, synthesizing the same number of images as the number of parallaxes. Alternatively, the three-dimensional image displayed in this type of display device is generated by obtaining a depth map from an image.

DETAILED DESCRIPTION

In general, according to one embodiment, an image processing device comprises an acquisition unit which obtains a target image, a generation unit which generates a three-dimensional image by reordering a plurality of video signals corresponding to the obtained target image such that each of the video signals is written to one of a plurality of pixels arranged in a horizontal direction while skipping a predetermined number of pixels, and an output unit which outputs the generated three-dimensional image to a display device.

According to another embodiment, a head-up display comprises an image processing device and a display device which outputs and displays a three-dimensional image output from the image processing device.

Embodiments will be described with reference to the accompanying drawings.

Figure 1:
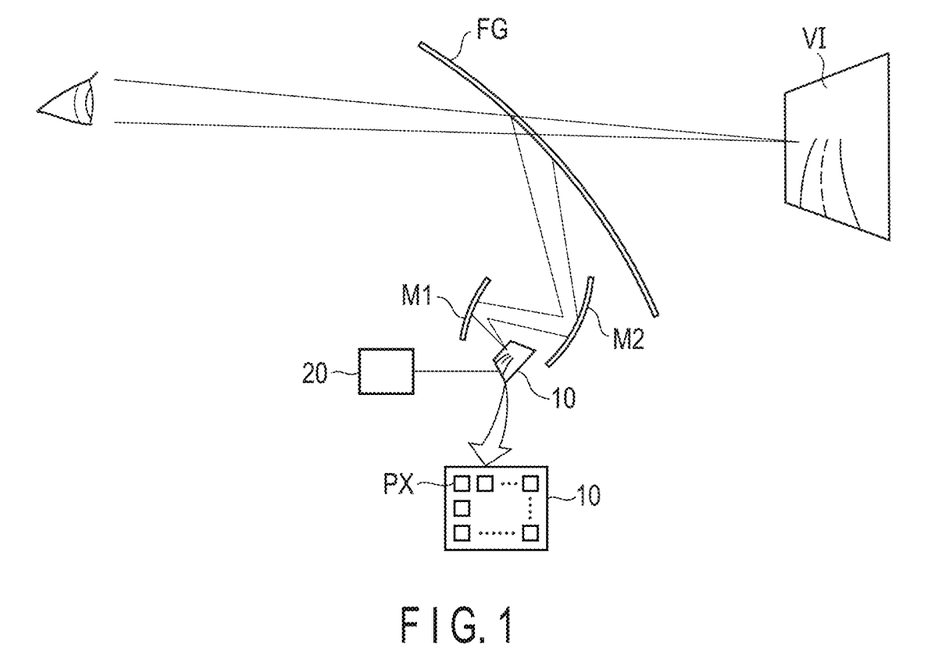
FIG. 1 is a diagram schematically showing a head-up display using a display device according to an embodiment.

The disclosure is merely an exaropie, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary, FIG. 1 is a schematic diagram showing the outline of a head-up display (HUD) using an image processing device according to an embodiment. A HUD comprises a liquid crystal display device 10 as a display device for projecting an image. The HUD comprises a plurality of concave mirrors, for example, two concave mirrors M1 and M2. The HUD further comprises an image processing device 20 electrically connected to the liquid crystal display device 10. The image processing device 20 may be connected to the liquid crystal display device 10 such that the image processing device 20 is allowed to communicate with the liquid crystal display device 10. The image processing device 20 generates a three-dimensional image and outputs the generated three-dimensional image to the liquid crystal display device 10. The liquid crystal display device 10 comprises a large number of pixels PX arrayed in matrix. When the liquid crystal display device 10 obtains the three-dimensional image output from the image processing device 20, the liquid crystal display device 10 writes video signals V corresponding to the obtained three-dimensional image to the pixels PX. By this configuration, the obtained three-dimensional image is output and displayed as a projection image. The projection image output from the liquid crystal display device 10 is reflected and condensed by the concave mirrors M1 and M2 and is projected on, for example, the inner surface of the windshield FG of an automobile. The projected image is reflected on the windshield FG to the viewer (driver) side and forms a virtual image VI several meters ahead of the windshield FG. In this specification, a three-dimensional image refers to an image entirely having a sense of depth or a sense of this-side.

The mirrors constituting a part of the HUD are not limited to concave mirrors. Other optical members may be selected. For example, half mirrors or Fresnel mirrors may be selected. The present embodiment is not limited to the configuration in which an image is directly projected on the windshield FG. A transparent reflector plate (projection surface) may be provided in front of the viewer such that an image is projected on the reflector place.

In the HUD shown in FIG. 1, for example, a parallax barrier and lenticular lenses are provided on the display surface of the liquid crystal display device 10.

The parallax barrier restricts a light beam which passes through the parallax barrier, and functions as a light control unit. A plurality of fine slits are provided in the parallax barrier. The slits are provided in a direction tilted at a predetermined angle with respect to the longitudinal direction of the display surface of the liquid crystal display device 10.

The lenticular lenses control the emission direction of a light beam which passes through the lenses, and function as a light control unit in a manner similar to that of the parallax barrier. Each lenticular lens is a semicylindrical lens extending in the longitudinal direction of the display surface of the liquid crystal display device 10. On the display surface of the liquid crystal display device 10, a plurality of lenticular lenses are provided so as to be arranged in the lateral direction of the display surface.

The provision of the parallax barrier and the lenticular lenses enables the viewer (driver) to view a three-dimensional image.

Figure 2:
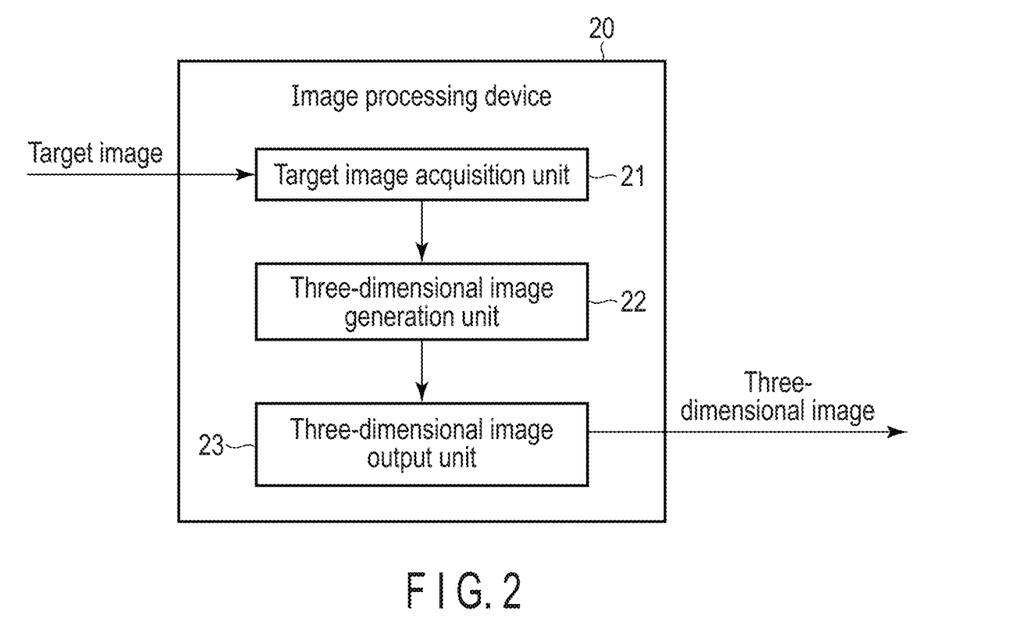
FIG. 2 is a block diagram showing a functional configuration example of an image processing device according to the embodiment.

FIG. 2 is a block diagram showing a functional configuration example ox the image processing device 20 according to the present embodiment. As shown in FIG. 2, the image processing device 10 comprises a target image acquisition unit 21, a three-dimensional image generation unit 22, a three-dimensional image output unit 23, etc.

The target image acquisition unit 21 obtains a target image (two-dimensional image) to be the base of a three-dimensional image. The target image may be, for example, an image of a car navigation system (for example, an image which suggests a corner for a right turn or a left turn) or a meter image corresponding to various types of meters such as a speedometer, a tachometer or a warning lamp. The obtained target image is output to the three-dimensional image generation unit 22.

The three-dimensional image generation unit 22 generates a three-dimensional image from a single target image obtained by the target image acquisition unit 21. As the three-dimensional image generation process performed by the three-dimensional image generation unit 22 is described later, detailed explanation thereof is omitted, here.

The three-dimensional image output unit 23 outputs the three-dimensional image generated by the three-dimensional image generation unit 22 to the liquid crystal display device 10. The liquid crystal display device 20 outputs and displays the three-dimensional image output by the three-dimensional image output unit 23 of the image processing device 20 as a projection image. By this configuration, a virtual image VI is formed several meters ahead of the windshield FIG. The viewer (driver) can view an image of a car navigation system and a meter image even without moving his/her line of sight from the travel direction of the vehicle.

Here, a reordering process performed by the three-dimensional image generation unit 22 is schematically explained with reference to FIG. 3 and FIG. 4.

Figure 3:
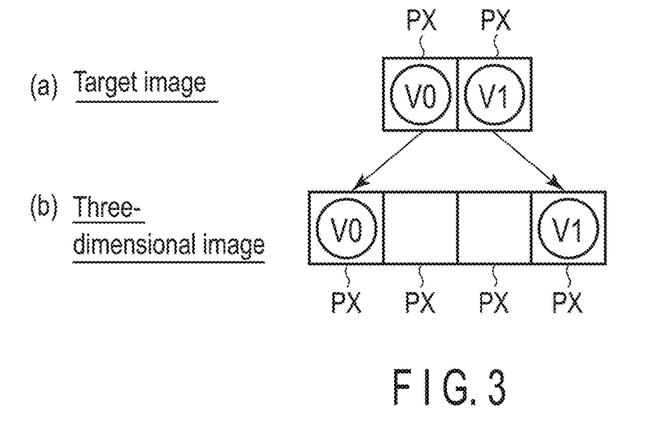
FIG. 3 is a diagram for schematically explaining a reordering process performed by the image processing device according to the embodiment.

FIG. 3 assumes that, as shown in FIG. 3a), the target image is an image which could be displayed by writing video signals V0 and VI to two pixels PX. In this case, when setting is applied such that a three-dimensional image corresponding to two parallaxes should be displayed in a location a predetermined distance away from the eyes of the viewer, as shown in FIG. 3(b), the three-dimensional image generation unit 22 generates a three-dimensional image by reordering video signals V0 and VI such that video signals V0 and VI are written to pixels PX while skipping two pixels PX.

The number of pixels PX to be skipped when video signals V0 and VI are written is determined based on how far from the eyes of the viewer the location in which a three-dimensional image should be displayed is. The distance from, the eyes of the viewer to the three-dimensional image can foe arbitrarily set by the viewer. In the following explanation, a value determined by the viewer by setting the distance from the eyes of the viewer to the three-dimensional image (in other words, the number of pixels PX to be skipped when video signals V are written to pixels PX) is defined as a set value n.

Further, the viewer can arbitrarily set the number of parallaxes to which the three-dimensional image to be displayed corresponds.

Figure 4:
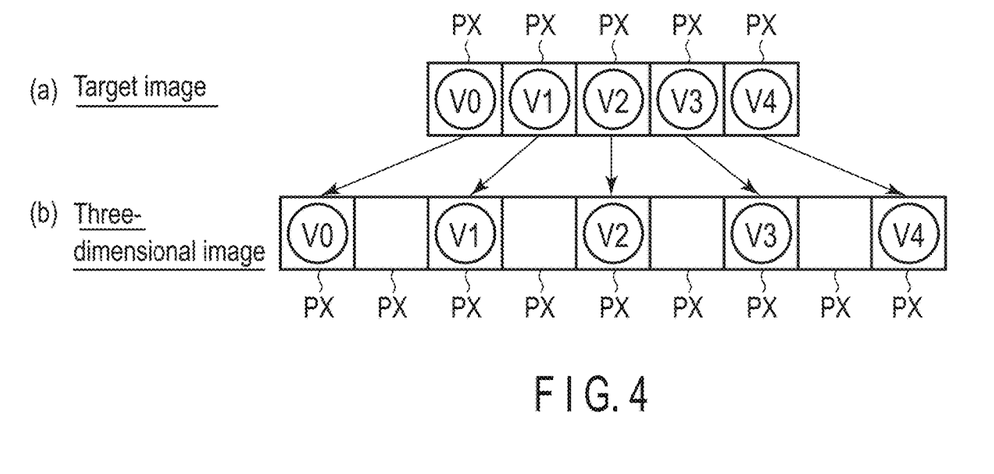
FIG. 4 is another diagram for schematically explaining a reordering process performed by the image processing device according to the embodiment.

FIG. 4 assumes that, as shown in FIG. 4(a), the target image is an image which could be displayed by writing video signals V0 to 74 to five pixels PX. In this case, when setting is applied such that a three-dimensional image corresponding to five parallaxes should be displayed in a location a predetermined distance (here, the distance in which the above set value n is one) away from the eyes of the viewer, as shown in FIG. 4(b), the three-dimensional image generation unit 22 generates a three-dimensional image by reordering video signals V0 to V4 such that video signals V0 to V4 are written to pixels PX while skipping one pixel PX.

Figure 5:
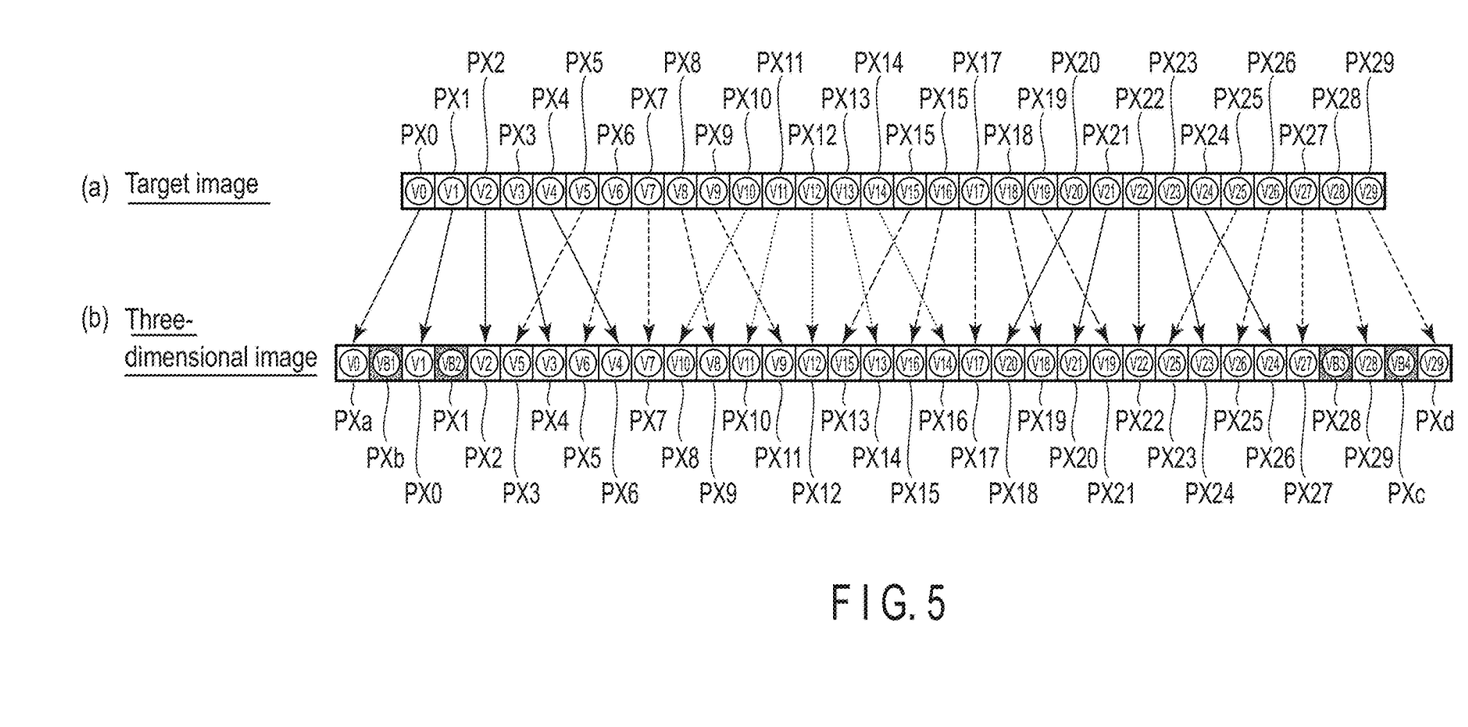
FIG. 5 is a diagram for specifically explaining a reordering process performed by the image processing device according to the embodiment.

Here, a reorderlag process performed by the three-dimensional image generation unit 22 is more specifically explained with reference to FIG. 5. FIG. 5 assumes that, as shown in FIG. 5(a), the target image is an image which could be displayed by writing video signals V0 to V29 to 30 pixels PX0 to PX2S. FIG. 5 assumes a case where a three-dimensional image corresponding to five parallaxes should be displayed in a location a predetermined distance away from the eyes of the viewer, and the set; value n determined based on the distance is one.

In this case, as the number of parallaxes to which the three-dimensional image to be displayed corresponds is five, and the above set value n is one, video signals V0 to V4, V5 to V9, V10 to V14, V15 to V19, V20 to V24 and V25 to V29 are reordered such that they are written to pixels PX while skipping one pixel PX. When a pixel PX to which none of video signals V0 to V29 can be written exists, the three-dimensional image generation unit 22 allocates a video signal V8 (video signals VB1 to VB4 shown in FIG. 5(b)) for displaying black to the pixel PX.

By this configuration, as shown in FIG. 5(b), a three-dimensional image in which video signals V are arranged in the order of video signal V0, video signal VB1, video signal V1, video signal VB2, video signal V2, video signal V5, video signal V3, video signal V6, video signal V4, video signal V7, . . . is generated.

Here, for example, this specification focuses attention on video signal V0. When the target image is displayed, video signal V0 is written to pixel PX0. However, as a result, of the above reordering, when a three-dimensional image is displayed, video signal V0 is written to pixel PXa to which pixel PX0 shifts in a horizontal direction by two pixels. Thus, the amount of shift of the pixel PX to which video signal V0 is written is two pixels. Similarly, this specification focuses attention on video signal V1. When the target image is displayed, video signal V1 is written to pixel PX1. However, as a result of the above reordering, when a three-dimensional image is displayed, video signal V1 is written to pixel PX0 to which pixel PX1 shifts in a horizontal direction by one pixel. Thus, the amount of shift of the pixel PX to which video signal V1 is written is one pixel. Further, this specification focuses attention on video signal V2. When either the target image or a three-dimensional image is displayed, video signal V2 is written to pixel PX2. Thus, the amount of shift of the pixel PX to which video signal V2 is written is zero.

In this way, the amount of shift of the pixel PX to which a video signal V is written (in other words, the amount of shift of a video signal V) is determined based on the location in other words, the coordinate) of the pixel to which a video signal V is written when the target image is displayed, the number of parallaxes to which a three-dimensional image corresponds, and the set value n described above.

The resolution of the three-dimensional image generated by performing the reordering process explained above is greater than that of the target image by n×(the number of parallaxes−1) as video signals V corresponding to the target image are allocated to pixels PX while skipping n pixels PX. For example, in the case of FIG. 5, while the resolution of the target image is 30 pixels, the resolution of the three-dimensional image is 34 pixels. Thus, the resolution of the three-dimensional image is greater than that of the target image by four pixels (=1×(5-1)). The four pixels are equivalent to the number of pixels to which video signals VB for displaying black (in the case of FIG. 5, video signals VB1 to VB4) are written.

The reordering process shown in FIG. 5 is performed in pixel row units.

Figure 6:
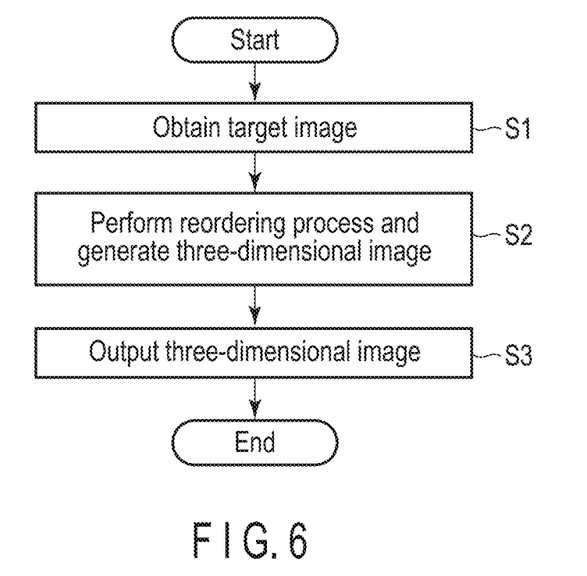
FIG. 6 is a flowchart showing an example or the procedure of a three-dimensional image generation process performed by the image processing device according to the embodiment.

FIG. 6 is a flowchart showing an example of the procedure of a three-dimensional image generation process performed by the three-dimensional image generation unit 22.

The three-dimensional image generation unit 22 obtains the target image output from the target image acquisition unit 21 (step S1). Subsequently, the three-dimensional image generation unit 22 performs the reordering process described above for video signals V corresponding to the obtained target image and generates a three-dimensional image (step S2), Subsequently, the three-dimensional image generation unit 22 outputs the generated three-dimensional image to the three-dimensional Image output unit 23 (step S3) and terminates a series of steps of the three-dimensional image generation process.

As described above, in the three-dimensional image generation process of the present embodiment, a three-dimensional image can be generated from a single target image. There is no need to synthesize the same number of images as the number of parallaxes or obtain a depth map. Thus, the processing load to the device to generate a three-dimensional image can be largely reduced.

Further, the three-dimensional image generation process of the present embodiment enables the generation of a three-dimensional image corresponding to the number of parallaxes which is arbitrarily set or changed. Thus, there is no need to change the parallax barrier or lenticular lenses which are already provided on the display surface of the liquid crystal display device 10. In other words, even when a parallax barrier or lenticular lenses are already provided on the display surface of the liquid crystal display device 10, a three-dimensional image corresponding to the number of parallaxes to which the parallax barrier or the lenticular lenses can correspond can be generated. Thus, there is no need to provide a new parallax barrier or lenticular lens in connection with the installation of the image processing device 20.

Figure 7:
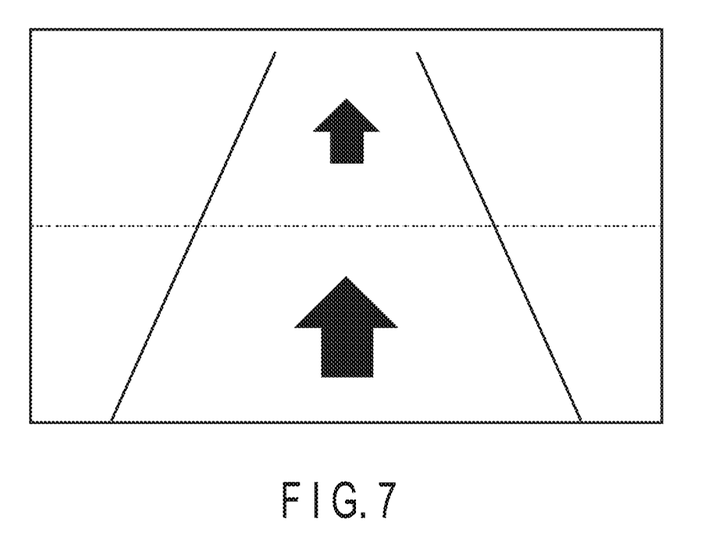
FIG. 7 is a diagram for explaining a modification example of a three-dimensional image generation process performed by the image processing device according to the embodiment.

In the embodiment described above, this specification explains a case where a three-dimensional, image which enables a viewer to view the entire three-dimensional image with the same sense of depth is generated. However, since the three-dimensional image generation unit 22 performs the above reordering process in pixel row units, it is possible to generate a three-dimensional image which enables a viewer to view the image with a different sense of depth depending on the pixel row. For example, as shown in FIG. 7, a three-dimensional image which allows a viewer to view the upper half of the image with a stronger sense of depth than the lower half can be generated.

In this case, the three-dimensional image generation unit 22 generates a three-dimensional image which enables a viewer to view the upper half of the image with a stronger sense of depth than the lower half by setting the set value n applied to the reordering process of video signals V written to the pixel rows of the upper half of the liquid crystal display device 10 so as to be greater than the set value n applied to the reordering process of video signals V written to the pixel rows of the lower half.

Figure 8:
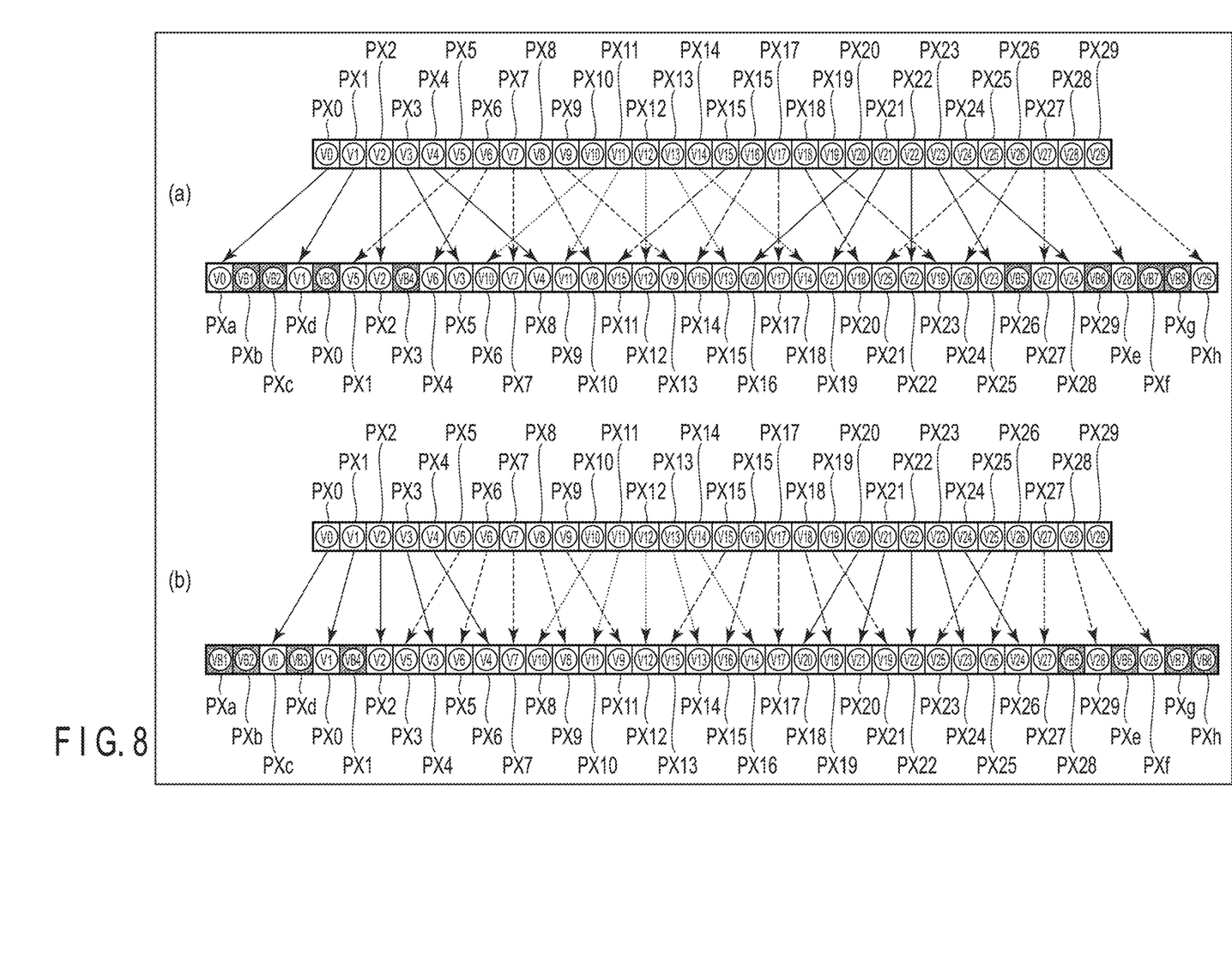
FIG. 8 is another diagram for explaining a modification example of a three-dimensional image generation process performed by the image processing device according to the embodiment.

FIG. 8 is a diagram for explaining a reordering process performed to generate a three-dimensional image which corresponds to five parallaxes and enables a viewer to view the upper half of the image with a stronger sense of depth than the lower half.

In this case, the three-dimensional image generation unit 22 sets the set value n applied to the reordering process of video signals V written to the pixel rows of the upper half of the liquid crystal display device 10 so as to be two. By this setting, as shown in FIG. 8(a), video signals V0 to V4, V5 to V9, V10 to V14, V15 to V19, V20 to V24 and V25 to V29 are reordered such that the signals are written to pixels PX while skipping two pixels PX. Video signals VB (video signals VB1 to VB3 shown in FIG. 8(a)) for displaying black are allocated to pixels PX to which none of video signals V0 to 729 can be written.

The three-dimensional image generation unit 22 sets the setting value n applied to the reordering process of video signals V written to the pixel rows of the lower half of the liquid crystal display device 10 so as to be one. By this setting, as shown in FIG. 3(b), video signals V0 to V4, V5 to V9, V10 to V14, V15 to V19, V20 to V24 and V25 to V29 are reordered such that the signals are written to pixels PX while skipping one pixel PX. In this case, similarly, video signals VB (video signals VB3 to VB6 shown in FIG. 8(b)) for displaying black are allocated to pixels PX to which none of video signals V0 to V29 can be written.

When pixel rows are caused to have different senses of depth from each other, the three-dimensional image generation unit 22 determines the resolution of the three-dimensional image based on the pixel row caused to have the strongest sense of depth. For example, in the case of FIG. 7 and FIG. 8, the resolution of the three-dimensional image is determined based on the number of video signals V written to the pixel rows of the upper half of the liquid crystal display device 10 (in other words, the number of pixels PX to which video signals V are written). To make the number of video signals V written to the pixel rows or the lower half of the liquid crystal display device 10 equal to the number of video signals V written to the pixel rows of the upper half of the liquid crystal display device 10, the three-dimensional image generation unit 22 further allocates video signals VB for displaying black (video signals BV1, VB2, VB7 and VB3 shown in FIG. 3(b)) to the both end portions of the pixel rows of the lower half. By this configuration, the resolution of the three-dimensional image displayed in the lower half of the liquid crystal display device 10 can be made equal to the resolution of the three-dimensional image displayed in the upper half of the liquid crystal display device 10.

The three-dimensional image generation process including the reordering process explained above allows the generation of a three-dimensional image which can be viewed with a different sense of depth (or a different sense of this-sidei depending on each pixel row.

In the embodiment described above, this specification explains a case where the parallax barrier and the lenticular lenses are provided on the entire display surface of the liquid crystal display device 10. However, the parallax barrier and the lenticular lenses may be provided on only a part of the display surface of the liquid crystal display device 10.

In this case, the three-dimensional image generation unit 22 should perform the reordering process described above for only video signals V written to the pixels PX located in the portions in which the parallax barrier and the lenticular lenses are provided. This configuration allows a viewer to view a three-dimensional image (three-dimensional image) corresponding to video signals V written to the pixels PX located in the portions in which the parallax barrier and the lenticular lenses are provided and to view a two-dimensional image corresponding to video signals V written to the pixels PX located in the portions in which the parallax barrier or the lenticular lenses are not provided.

According to the embodiment explained above, the image processing device 20 comprises the target image acquisition unit 21 which obtains a target image, the three-dimensional image generation unit 22 which generates a three-dimensional image by reordering a plurality of video signals V corresponding to the obtained target image such that each video signal V is written to one of the pixels PX arranged in a horizontal direction while skipping n pixels PX, and the three-dimensional image output unit 23 which outputs the generated three-dimensional image to the liquid crystal display device 10. In this way, a three-dimensional image can be generated from a single target image. Thus, the processing load when a three-dimensional image is generated can be reduced.

Further, the head-up display HUD comprising the image processing device 20 and the liquid crystal display device 10 which outputs and displays a three-dimensional image output from the image processing device 20 can be provided.

Various modification examples which may be conceived by a person of ordinary skill in the art in the scope of the idea of the present invention will also fall within the scope of the invention. For example, even if a person of ordinary skill in the art arbitrarily modifies the above embodiment by adding or deleting a structural element ox changing the design of a structural element, or adding or omitting a step or changing the condition of a step, all of the modifications fail within the scope of the present invention as long as they are in keeping with the spirit of the invention.

Further, other effects which may be obtained from the above embodiment and are self-explanatory from the descriptions of the specification or can be arbitrarily conceived by a person of ordinary skill in the art are considered as the effects of the present invention as a matter of course.

What is claimed is:

1. An image processing device comprising:
an acquisition unit which obtains a target image;
a generation unit which generates a three-dimensional image by reordering a plurality of video signals corresponding to the obtained target image such that each of the video signals is written to one of a plurality of pixels arranged in a horizontal direction while skipping a predetermined number of pixels; and
an output unit which outputs the generated three-dimensional image to a display device, wherein
the predetermined number is determined based on a distance from a location of a virtual image formed when the three-dimensional image is output and displayed to a location in which the three-dimensional image is viewed by a viewer, and
when the predetermined number is n, a resolution of the three-dimensional image is greater than a resolution of the target image by n×(the number of parallaxes−1).

2. The image processing device of claim 1, wherein the generation unit generates the three-dimensional image by reordering the video signals so as to be written to the same number of pixels as the number of parallaxes while skipping the predetermined number of pixels.

3. The image processing device of claim 1, wherein the generation unit allocates a video signal for displaying black to a pixel to which none of the video signals can be written.

4. The image processing device of claim 3, wherein the video signal for displaying black is allocated to, of the pixels arranged in the horizontal direction, pixels near both end portions.

5. A head-up display comprising:
the image processing device of claim 1; and
a display device which outputs and displays the three-dimensional image output from the image processing device.

6. An image processing device comprising:
processing circuitry configured to obtain a target image;
the processing circuitry further configured to generate a three-dimensional image by reordering a plurality of video signals corresponding to the obtained target image such that each of the video signals is written to one of a plurality of pixels arranged in a horizontal direction while skipping a predetermined number of pixels; and
the processing circuitry is further configured to output the generated three-dimensional image to a display device, wherein
the predetermined number is determined based on a distance from a location of a virtual image formed when the three-dimensional image is output and displayed to a location in which the three-dimensional image is viewed by a viewer, and
when the predetermined number is n, a resolution of the three-dimensional image is greater than a resolution of the target image by n×(the number of parallaxes−1).

7. A head-up display comprising:
the image processing device of claim 6; and
a display device which outputs and displays the three-dimensional image output from the image processing device.

* * * * *